United States Patent [19]

Beck et al.

[11] Patent Number: 4,493,875
[45] Date of Patent: Jan. 15, 1985

[54] PROPPANT FOR WELL FRACTURES AND METHOD OF MAKING SAME

[75] Inventors: Warren R. Beck; Richard B. Castle, both of St. Paul, Minn.

[73] Assignee: Minnesota Mining and Manufacturing Company, St. Paul, Minn.

[21] Appl. No.: 559,965

[22] Filed: Dec. 9, 1983

[51] Int. Cl.³ .......................... B32B 1/00; B32B 3/14; B32B 7/02

[52] U.S. Cl. .................................. 428/403; 427/202; 428/404

[58] Field of Search ............... 428/313.9, 313.3, 312.6, 428/312.8, 404, 406, 403; 427/202

[56] References Cited

U.S. PATENT DOCUMENTS

| | | | |
|---|---|---|---|
| 2,331,868 | 10/1943 | Swenson | 428/406 |
| 3,026,938 | 3/1962 | Huitt et al. | 166/42 |
| 3,155,162 | 11/1964 | Flickinger et al. | 166/42 |
| 3,314,838 | 4/1967 | Erwin | 156/71 |
| 3,354,959 | 11/1967 | Fast et al. | 166/42 |
| 3,376,930 | 4/1968 | Kiel et al. | 166/42 |
| 3,399,727 | 9/1968 | Graham et al. | 166/42 |
| 3,429,955 | 2/1969 | Johnson et al. | 264/45.3 |
| 3,473,952 | 10/1969 | McFadden | 428/164 |
| 3,929,191 | 12/1975 | Graham et al. | 166/276 |
| 4,078,610 | 3/1978 | Arnold | 166/280 |
| 4,143,202 | 3/1979 | Tseng et al. | 428/406 |
| 4,231,428 | 11/1980 | Needham et al. | 166/280 |
| 4,336,842 | 6/1982 | Graham et al. | 166/276 |

OTHER PUBLICATIONS

Jones, A. H. et al., "Light Weight Proppants for Deep Gas Well Stimulation", Terra Tek, Inc., TR 804, Jun. 1980.
Norton STS Proppant Literature.

Primary Examiner—William J. Van Balen
Attorney, Agent, or Firm—Donald M. Sell; James A. Smith; Douglas B. Little

[57] ABSTRACT

The novel proppant consists of composite particles, the core of which is a conventional proppant particle such as silica sand. The core has a thin, void-containing coating which provides an overall density approaching that of the fracturing fluid. The coating preferably comprises hollow glass microspheres embedded in an adhesive which bonds the microspheres to the core.

18 Claims, 2 Drawing Figures

PROPPANT FOR WELL FRACTURES AND METHOD OF MAKING SAME

TECHNICAL FIELD

The invention relates to proppants used in hydraulic fracturing of subterranean formations penetrated by wells.

BACKGROUND ART

The completion of an oil, gas, water or geothermal well often involves hydraulic fracturing wherein spacer particles (called proppants) are injected with the fracturing fluid to maintain the fractures in a propped condition. While sand is the most common proppant because of its low cost and availability, other particles have also been used such as glass beads as taught in U.S. Pat. No. 3,155,162 (Flickinger et al.). According to U.S. Pat. No. 3,399,727 (Graham et al.), the proppant theoretically should be distributed within each fracture as a partial monolayer, leaving relatively large spaces between its individual particles through which the fluid being recovered can flow. However, if its density greatly exceeds that of the fracturing fluid, the proppant tends to settle out, leaving upper portions of fractures poorly supported. The Graham patent deals with this problem by using as the proppant glass or other ceramic particles having internal voids and hence a density approaching that of the fracturing fluid. The Graham patent also suggests increasing the density of the fracturing fluid by the addition of a weighting agent such as $BaSO_4$, $BaO$ or $ZnS$.

Although a great many other patents concern improved proppants, no other prior art has been found which discloses a proppant of reduced density other than particles having internal voids.

Among patents dealing with improved proppants is U.S. Pat. No. 3,026,938 (Glenshaw et al.) involving coating the entire surface of each particle of a proppant with a nonbrittle plastic film to confine and prevent dispersion of small fragments should the particle rupture under the pressure of a propped fracture. U.S. Pat. No. 3,929,191 (Graham et al.) discloses additional coating resins such as phenol formaldehyde resins. The proppant of U.S. Pat. No. 3,376,930 (Kiel et al.) consists of individual frangible cores, to each of which is adhesively bonded a relatively thin coating of metallic microparticles. U.S. Pat. No. 4,078,610 (Arnold) employs metal-plated proppant particles coated with a thermoplastic polymer such as polyethylene. The proppant of U.S. Pat. No. 4,231,428 (Needham et al.) has an organosilicon coating to protect the cores of the particles from water which otherwise might reduce their compressive strength.

DISCLOSURE OF INVENTION

The present invention concerns a proppant which, like that of U.S. Pat. No. 3,399,727, has reduced density approaching densities of typical fracturing fluids and thus tends to avoid the settling problem discussed in that patent. This is achieved without any sacrifice in the compressive strength of the proppant material. The novel proppant consists of particles, each having (a) a relatively large dense core of high compressive strength, and (b) a relatively thin void-containing coating of a density less than 0.8 g/cc, which composite particle has an overall average diameter from 0.2 to 3 mm. The coating may be a foamed ceramic such as glass but preferably comprises hollow ceramic microparticles adhesively bonded to the core. Preferred ceramic microparticles are hollow glass microspheres. Other useful hollow ceramic microparticles include fly ash which is of very low cost but of higher density than hollow glass microspheres.

The core may be of any material having sufficient compressive strength for proppant utility such as high-purity silica sand, bauxite (aluminum oxide), metal or a ceramic such as glass. A number of high-strength proppant materials are listed in a publication of Terra Tek, Inc. by A. H. Jones et al. entitled "Light Weight Proppants for Deep Gas Well Stimulation," published in June 1980 under U.S. Department of Energy Contract No. DE-AC19-79BC10038. Among those materials are

| Proppant Material | Compressive Strength (GPa) |
| --- | --- |
| alumina | 3.1 |
| boron carbide | 2.8 |
| zirconia | 2.1 |
| silica | 2.1 |
| silicon carbide | 1.4 |
| mullite | 0.69 |
| forsterite | 0.55 |
| cordierite | 0.34 |
| boron nitride | 0.32 |

The core may contain voids as long as the voids do not unduly reduce its compressive strength. It is believed that any core having a density substantially less than 2.2 g/cc would not have sufficient strength. Preferably the compressive strenth of the core is at least 1 GPa.

In present commercial practice, individual proppant particles usually are approximately spherical and are sieved to pass 20 mesh and to be retained on 40 mesh (U.S.A. Standard), thus having a diameter within the approximate range of 0.42 to 0.84 mm. The same procedure is preferably employed in making core particles to be used in the present invention.

The void-containing coating applied to each core particle in the present invention typically has a thickness from about 5 to 20% of the average diameter of the core. Preferably the density of the coating is from about 0.15 to 0.6 g/cc in order to provide a proppant density approaching that of the fracturing fluid. Individual proppant particles of the invention preferably have densities of about 1.3 to 2.5 g/cc for use with fracturing fluids which typically have densities from about 1.1 to 1.5 g/cc.

A preferred proppant of the invention comprises composite particles, each having a high-strength core of 300 to 1000 micrometers and a low density coating which has an average thickness from 25 to 100 micrometers. The coating preferably comprises hollow ceramic microparticles such as glass microspheres 20 to 50 micrometers in average diameter. An adhesive bonds the microparticles to the core. Such a coating may be applied to a great number of dense, high-strength core particles by the steps of:

(1) mixing the core particles with adhesive to provide adhesive-coated core particles, (2) while the adhesive is tacky, mixing the coated core particles with hollow microparticles (preferably hollow ceramic microparticles) to adhere a plurality of the microparticles to each coated core, and (3) curing each adhesive composition to a nontacky state while keeping the individual coated core particles substantially out of adherent contact with each other.

A proppant of even lower density can be obtained by sequentially repeating steps 1 to 2, preferably prior to step 3. In step 3, the coated core particles may be kept essentially out of adherent contact with each other by being tumbled in an excess of hollow microparticles until the exposed adhesive composition has cured to a substantially nontacky state. It is immaterial whether or not the coated core particles become lightly adhered to each other if they substantially separate upon being dispersed into the fracturing fluid or upon moving under pressure into fractures.

To guard against undue aggregation of the coated particles, the adhesive preferably is applied in two steps, first to provide a tacky coating and then as a nontacky powder over the tacky coating.

The novel proppant can be made by other methods such as by spray drying a slurry of core particles and hollow microparticles in a binder solution.

Instead of applying hollow microparticles over dense core particles, other relatively thin, void-containing coatings such as a foamed resinous or ceramic coating may be applied. It is necessary that the coating remain substantially intact only during the fracturing operation. Any low-density, void-containing coating is likely to collapse as soon as fracturing pressures are released and the fractures begin to close upon the proppant. Even after fracturing, the coating on each particle should aid in distributing compressive forces, as has been taught in the prior art for other types of coatings on proppant particles. Also, such a coating should confine and prevent the dispersion of small fragments of any core which ruptures, as taught in U.S. Pat. No. 3,026,938. The coating may also protect the core from water which otherwise might weaken the core as taught in U.S. Pat. No. 4,231,428.

Figure 1:
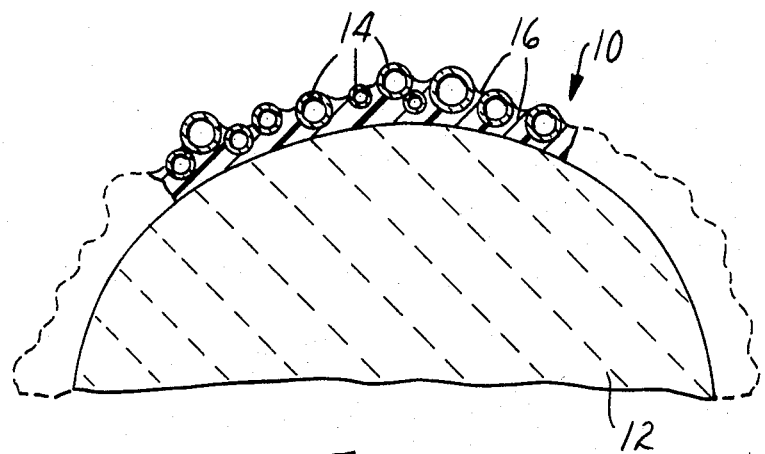
FIG. 1 is a schematic central cross-section of a preferred proppant particle of the invention having a sand core.

The proppant particle 10 shown in FIG. 1 has a grain of sand as its core 12, over which is a coating of a layer of hollow glass microspheres 14 and a cured resinous adhesive 16 which adheres the microspheres to the core 12 and to each other.

Figure 2:
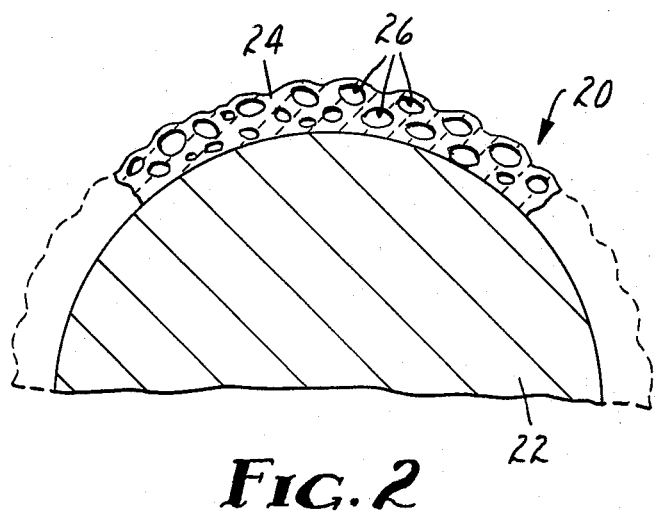
FIG. 2 is a schematic central cross-section of another proppant particle of the invention having a bauxite core.

The proppant particle 20 of FIG. 2 has a sintered bauxite core 22, over which is a coating 24 of foamed ceramic having hollow cells 26.

In the examples, all parts are given by weight.

EXAMPLE 1

Used for the core particles was silica sand ("Granuile #20", Unimin Corp. New Canaan, Conn.) which was said to be between 20 and 40 U.S.A. mesh (0.42 to 0.84 mm openings) but was found to comprise 15.9% by weight of particles below 0.42 mm. Its density was 2.66 g/cc measured with an air comparison pycnometer. Two hundred grams of the sand were mixed with 6 grams of catalyzed liquid resole phenol/formaldehyde resin (64.3% solids in water). The resin had a Brookfield viscosity of 1800 cps and a pH of 9.2 when measured at 77% solids. Air drying for four hours provided a tacky sand.

A nontacky, uncured phenol/formaldehyde resin ("Varcum 5485", Reichhold Chemical Co.) was crushed to a powder and screened between 140 and 200 U.S.A. mesh (74 to 105 micrometer openings). An excess of the powder was mixed by spatula with the tacky sand, resulting in a uniform coating of the powder on each grain of sand. After drying in an oven for 45 minutes at 63° C., the coated sand was screened to remove excess resin powder.

An octagonal kiln was loaded with hollow glass microspheres having an average diameter of about 30 micrometers and a nominal density of 0.6 g/cc. While rotating the kiln at 16 rpm at 140° C., the resin-coated sand particles were slowly added and rotation continued for 5 minutes. After passing this over 40-mesh screen (0.42 mm openings) to remove excess glass bubbles, the coated particles were heated at 120° C. for 4 hours to cure the resin. The final product was a proppant primarily consisting of loose particles, each having a single core coated with resin containing glass microspheres. The proppant had an average density of about 1.875 g/cc, and the average thickness of each coating was about 10% of its core diameter. Burn-off indicated that resin comprised 7.4% of the proppant.

EXAMPLE 2

Used for the core particles were glass beads having a density of 3.02 g/cc and an average diameter of about 1700 micrometers. These were first provided with a tacky coating as in Example 1 except that the resole comprised 80% solids in water. To the tacky sand was applied the same nontacky resin except that it had been screened between 70 and 200 U.S.A. mesh (74 to 210 micrometer openings). To the resin coatings were applied hollow glass microspheres in the manner of Example 1, but their average diameter was 40 micrometers and their nominal density was 0.38 g/cc. The product proppant particles had an average density of 1.59 g/cc, and the average thickness of their coatings was about 20% of their average core diameter.

EXAMPLE 3

Proppant particles were prepared in the same way as in Example 1 except using as the cores bauxite particles having a density of 3.81 g/cc. 99.8% of the particles passed 10 and were retained on 40 USA mesh (0.42 to 2.0 mm openings). Their average diameter was about 0.8 mm.

The density of the coated particles was 2.78 g/cc, and the average thickness of the coatings was about 7% of the average core diameter.

EXAMPLE 4

An additional layer of hollow glass microspheres was applied to each of the proppant particles of Example 3 as follows. With 43 g of those proppant particles were mixed 2 g of catalyzed liquid resole phenol/formaldehyde resin (64.3% solids in water), followed by air drying for four hours. This was mixed with an excess of the "Varcum 5485" phenol/formaldehyde resin powder as in Example 1. After drying in an oven for 20 minutes at 63° C., the coated particles were screened to remove excess powder.

An octagonal kiln was loaded with hollow glass microspheres, and the coated particles were slowly added, followed by screening and heating, all as described in Example 1. The final product was a proppant consisting of loose particles, each having a bauxite core coated with two layers of hollow glass microspheres. Average density was about 1.84 g/cc, and the average thickness of the two-layer coating was about 20% of the average core diameter.

TESTING

The proppant particles of Examples 1 and 3 were subjected to the A.P.I. crush test. The test involves charging a die 5.7 cm in diameter with 43.0 grams of proppant, applying a specified pressure for two minutes, and then screening through 40 U.S.A. mesh (0.42 micrometer openings) to determine the amount of particles which had been crushed to less than that size. Significant production of fine particles under crushing is to be avoided since fines tend to reduce the flow of fluids through proppant fractures.

|  | Percent of particles below 0.42 micrometer | |
|---|---|---|
|  | Before Crushing | After Crushing |
| Example 1 | 1.2 | 4.5 |
| Uncoated sand | 15.9 | 36.6 |
| Example 3 | 0.5 | 2.4 |
| Uncoated bauxite | 0.2 | 11.4 |

We claim:
1. A composite particle which is useful as a proppant and comprises
   (a) a high-strength core having a density of at least 2.2 g/cc, and
   (b) a thin void-containing coating of a density less than 0.8 g/cc, which composite particle has an overall average diameter from 0.2 to 3 mm.
2. A composite particle as defined in claim 1 wherein the coating comprises hollow ceramic microparticles adhesively bonded to the core.
3. A composite particle as defined in claim 2 wherein the ceramic microparticles are glass microspheres.
4. A composite particle as defined in claim 1 wherein the coating comprises a foamed ceramic.
5. A composite particle as defined in claim 4 wherein the ceramic is glass.
6. A composite particle as defined in claim 1 wherein the core is sand.
7. A composite particle as defined in claim 1 wherein the core is aluminum oxide.
8. A composite particle as defined in claim 1 wherein the core is a ceramic.
9. A composite particle as defined in claim 8 wherein the ceramic is glass.
10. A composite particle as defined in claim 1 wherein the core has a compressive strength of at least 1 GPa.
11. A proppant consisting of a great number of composite particles as defined in claim 1 having an average overall diameter from 0.3 to 1.0 mm.
12. A proppant as defined in claim 11 wherein the average thickness of the coatings is from 5 to 20% of the average diameter of the cores.
13. A proppant as defined in claim 12 wherein the coatings have a density from 0.15 to 0.6 g/cc.
14. A proppant as defined in claim 13 wherein the individual composite particles have a density from of 1.3 to 2.5 g/cc.
15. A proppant as defined in claim 13 wherein the void-containing coating of each composite particle comprises hollow ceramic microparticles having an average diameter from 20 to 50 micrometers.
16. Proppant as defined in claim 15 wherein the ceramic microparticles are hollow glass microspheres.
17. Method of making composite particles useful as proppants comprising the steps of:
   (1) mixing dense, high-strength core particles with adhesive to provide adhesive-coated particles,
   (2) while the adhesive is tacky, mixing the coated core particles with hollow ceramic microparticles to adhere a plurality of the microparticles to each coated core, and
   (3) curing the adhesive to a nontacky state while keeping the individual coated core particles substantially out of adherent contact with each other.
18. Method as defined in claim 17 wherein steps 1 and 2 are sequentially repeated prior to step 3.

* * * * *